United States Patent Office 2,823,101
Patented Feb. 11, 1958

2,823,101

PRODUCTION OF HYDROXYLAMINE SALTS BY REDUCTION OF NITRIC OXIDE

Kurt Jockers, Hermann Meier, and Karl Wintersberger, Ludwigshafen (Rhine), Germany, assignors to Badische Anilin- & Soda-Fabrik Aktiengesellschaft, Ludwigshafen (Rhine), Germany No Drawing. Application March 29, 1955
Serial No. 497,803

Claims priority, application Germany March 31, 1954

8 Claims. (Cl. 23—117)

This invention relates to a process for the production of hydroxylamine salts by reduction of nitric oxide with hydrogen in acid medium using a catalyst containing platinum and one or more elements of the 5th and/or 6th main group of the periodic system with an atomic weight greater than 31, viz., arsenic, antimony, bismuth, sulphur, selenium, and tellurium.

It is already known that hydroxylamine salts can be prepared by catalytic reduction of nitric oxide with hydrogen at catalysts containing platinum metal in acid medium. In this reaction of nitric oxide and hydrogen, however, a considerable part of the nitric oxide is also reduced to ammonia or to ammonium salts, so that the economy of the process is reduced. This drawback has been exhibited by all the catalysts containing platinum metal hitherto known, that is the molecular ratio of hydroxylamine formed to the sum of the ammonia and hydroxylamine formed (hereinafter referred to as the "specificity") is relatively unfavorable therewith.

We have now found that the reaction of nitric oxide and hydrogen leads to an increased yield of hydroxylamine by carrying it out in the presence of catalysts containing platinum metal which contain one or more elements of the 5th and/or 6th main group of the periodic system with an atomic weight greater than 31. These elements can be added in the form of suitable compounds to the catalysts during their preparation, the compounds thereby being reduced to the corresponding elements. The elements may also be added to the platinum-metal-containing catalyst in the form of compounds which only are reduced under the conditions of the hydroxylamine production in the reaction medium. The compounds can however also be added to the platinum-metal-containing catalysts in the reaction medium before or during the reduction of the nitric oxide. The most favorable amount of the compound to be added depends on the nature of the element selected. When adding the compounds to the suspension of the catalyst in the acid before or during the reduction of the nitric oxide, a single addition of about 3 to 5 atomic percent of the element or elements concerned, with reference to the platinum metal applied, is usually sufficient. If the compounds are added during the preparation of the catalyst, the amount to be added is usually higher and amounts to about 5 to 15 atomic percent of the element or elements with reference to the amount of platinum metal contained in the catalyst. When using the said elements of the 5th main group of the periodic system as additions, trivalent compounds of the same have proved especially suitable, and when using the said elements of the 6th main group, the divalent and tetravalent compounds of these elements.

The fact should especially be emphasized that the addition of these compounds does not impair either the activity or the life of the catalysts when the dosage is favorable.

By the influence on the specificity of catalysts containing platinum metal according to this invention in the sense of an increased formation of hydroxylamine, the economy of the process is considerably improved. Moreover the reaction solution obtained can be worked up more simply to pure hydroxylamine salts by reason of its higher content of hydroxylamine salts.

The following examples will further illustrate this invention but the invention is not restricted to these examples. The parts are parts by weight and the atomic percentages are with reference to the amount of platinum metal used.

Example 1

Illustrating the effect of additions of compounds of arsenic, antimony and bismuth to the suspension of the catalyst in the acid:

The catalyst used is a 1% platinum catalyst on graphite as a carrier substance, prepared by reduction of an aqueous platinum chloride solution with formic acid in the presence of graphite powder.

Four entirely identical stirring vessels A, B, C and D are each charged with 450 parts of 3.5-normal sulfuric acid and 10 parts of the catalyst. Whereas there is no further addition to the charged vessel A, 4 atomic percent of arsenic in the form of arsenious acid are added to vessel B, 3 atomic percent of antimony in the form of potassium antimonyl tartrate to vessel C and 3 atomic percent of bismuth in the form of bismuth nitrate to vessel D. A gas mixture of 5.2 parts of nitric oxide and 0.7 part of hydrogen per hour is led under the same conditions at 45° C. and atmospheric pressure into each of the four vessels. After a reaction duration of 6 hours each, the catalysts are separated from the reaction solutions, the same amount of fresh sulfuric acid as specified above is added to each without the addition of further arsenic, antimony or bismuth, and the reaction of nitric oxide and hydrogen again carried out. The activities of the catalysts in all the vessels vary between 43 and 45 grams of nitric oxide per gram of platinum per hour, and are thus practically constant within the limits of experimental error. The following values are found for the average specificity in ten such batches for the catalysts used in the four vessels:

A: 63.2%, B: 78.1%, C: 75.8% and D: 73.2%

The additions in vessels B, C and D thus reduce the undesirable formation of ammonia from 37% in vessel A to 22% in vessel B, 24% in vessel C and 27% in vessel D.

Example 2

Illustrating the effect of additions of compounds of sulfur, selenium and tellurium to the suspension of the catalyst in the acid:

The catalyst and apparatus used and the manner in which the tests are carried out are the same as in Example 1.

Whereas there is no further addition to vessel A, 2.5 atomic percent of sulfur in the form of sodium sulfide are added to vessel B, 3 atomic percent of selenium in the form of selenious acid to vessel C and 5 atomic percent of tellurium in the form of tellurious acid to vessel D. The average specificity of the catalysts used in ten batches is 62.8% for the catalyst in vessel A, 78.7% in vessel B, 77.5% in vessel C and 81.5% in vessel D. The activities of the catalysts in all the vessels lie between 43 and 45 grams per gram of platinum per hour.

Example 3

Illustrating the effect of combined additions of compounds of arsenic and antimony or selenium and tellurium or arsenic and selenium to the suspension of the catalyst in the acid:

The catalyst and apparatus used and the manner in which the tests are carried out are the same as in Example 1.

Whereas there is no further addition to vessel A, 2 atomic percent of arsenic as arsenious acid and 2 atomic percent of antimony as potassium antimonyl tartrate are added to vessel B, 2 atomic percent of selenium as selenious acid and 3 atomic percent of tellurium as tellurious acid to vessel C and 2 atomic percent of arsenic as arsenious acid and 2 atomic percent of selenium as selenious acid to vessel D. The average specificity of the catalysts used in ten batches amounts in the case of the catalyst in vessel A to 63.9%, in vessel B to 78.9%, in vessel C to 82.5% and in vessel D to 78.6%. The activities of the catalysts in all vessels are constant within the limits of experimental error.

*Example 4*

Illustrating the effect of additions of compounds of arsenic, antimony and selenium in the production of the catalyst:

In vessel A there is used the same catalyst as in Example 1. In the preparation of the catalyst for vessel B, 12 atomic percent of arsenic in the form of arsenious acid are added to the aqueous platinum chloride solution before the reduction with formic acid, for the catalyst for vessel C 8 atomic percent of antimony are added in the form of potassium antimonyl tartrate and for the catalyst for vessel D 8 atomic percent of selenium in the form of selenious acid.

The apparatus and procedure are the same as in Example 1. The average specificity of the catalysts used in ten batches amounts in the case of the catalyst in vessel A to 61.7%, in vessel B to 80.5%, in vessel C to 83.2% and in vessel D to 79%. The activities of the catalysts in all vessels lie within 42 to 44 grams of nitric acid per gram of platinum per hour.

*Example 5*

Illustrating the effect of the addition of an arsenic compound to the suspension of a catalyst consisting of a platinum alloy in the acid:

Two entirely identical stirring vessels A and B are each charged with 450 parts of 3.5-normal sulfuric acid and 10 parts of a 1% catalyst with 95% of platinum and 5% of gold on graphite as a carrier substance, prepared by reduction of an aqueous solution of the chlorides with formic acid in the presence of graphite powder. Whereas there is no further addition to vessel A, 4 atomic percent of arsenic in the form of arsenious acid are added to vessel B. Under the conditions given in Example 1, a gas mixture of 6.2 parts of nitric oxide and 0.8 part of hydrogen per hour is led into each vessel. After a reaction duration of 6 hours the catalysts are separated from the reaction solutions and the same amount of sulfuric acid as defined above is added in each case without further addition of arsenious acid, whereupon the reaction of nitric acid and hydrogen therein is carried out again. The average specificity in ten batches amounts to 56.4% in the case of the catalyst in vessel A and to 77.6% with the catalyst in vessel B. The activity of the catalysts lies in both cases at 50 to 53 grams of nitric oxide per gram of alloy per hour.

We claim:

1. In the production of hydroxylamine salts, forming said salts by reduction of nitric oxide with hydrogen in an acid medium in the presence of a catalyst containing platinum and at least one of the elements selected from the group consisting of arsenic, antimony, bismuth, sulfur, selenium and tellurium.

2. In the production of hydroxylamine salts, forming said salts by reduction of nitric oxide with hydrogen in an acid medium in the presence of a catalyst prepared by common reduction of a platinum compound and at least one compound of at least one of the elements selected from the group consisting of arsenic, antimony, bismuth, sulfur, selenium and tellurium, the said compounds being reduced thereby to their respective elements.

3. In the production of hydroxylamine salts, forming said salts by reduction of nitric oxide with hydrogen in an acid medium in the presence of a catalyst prepared by adding to a catalyst containing platinum metal at least one compound of at least one of the elements selected from the group consisting of arsenic, antimony, bismuth, sulfur, selenium and tellurium, the said compound being reduced under the conditions of the hydroxylamine production in the reaction medium to the respective element in the aforementioned group.

4. In the production of hydroxylamine salts by reduction of nitric oxide with hydrogen in an acid medium in the presence of a catalyst containing platinum the improvement which comprises adding to the catalyst containing platinum metal, in the reaction medium, at least one reducible compound of at least one of the elements selected from the group consisting of arsenic, antimony, bismuth, sulfur, selenium and tellurium, the said compound being reduced under the conditions of the hydroxylamine production to the respective element in the aforementioned group.

5. In the production of hydroxylamine salts by reduction of nitric oxide with hydrogen in an acid medium in the presence of a catalyst containing platinum the improvement which comprises adding to the catalyst containing platinum metal, in the reaction medium, at least one compound of at least one of the elements of the 5th and 6th groups of the periodic system having an atomic weight greater than 31, said elements selected from the group consisting of arsenic, antimony, bismuth, sulfur, selenium and tellurium, the said compound being reduced under the conditions of the hydroxylamine production to the respective element, the elements arsenic, antimony and bismuth being added in the form of a trivalent compound and the sulfur, selenium and tellurium being added in the form of a divalent to tetravalent compound.

6. In the production of hydroxylamine salts by reduction of nitric oxide with hydrogen in an acid medium in the presence of a catalyst containing platinum the improvement which comprises using a catalyst prepared by common reduction of a platinum compound and at least one compound of at least one of the elements selected from the group consisting of arsenic, antimony, bismuth, sulfur, selenium and tellurium, the said compound being reduced thereby to the respective element in the aforementioned group, and added in an amount corresponding to about 5 to 15 atomic percent of the particular element in the aforementioned group, percentage being with reference to the amount of platinum metal contained in the catalyst.

7. In the production of hydroxylamine salts by reduction of nitric oxide with hydrogen in an acid medium in the presence of a catalyst containing platinum the improvement which comprises using a catalyst prepared by adding to a catalyst containing platinum metal at least one reducible compound of at least one of the elements selected from the group consisting of arsenic, antimony, bismuth, sulfur, selenium and tellurium, the said compound being reduced under the conditions of the hydroxylamine production, in the reaction medium, to the respective element in the aforementioned group, and added in an amount corresponding to about 3 to 5 atomic percent of the particular element in the aforementioned group, the percentage being with reference to the amount of platinum metal applied.

8. In the production of hydroxylamine salts by reduction of nitric oxide with hydrogen in an acid medium in the presence of a catalyst containing platinum the improvement which comprises adding to the catalyst containing platinum metal, in the reaction medium, at least one reducible compound of at least one of the elements selected from the group consisting of arsenic, antimony, bismuth, sulfur, selenium and tellurium, the said compound being reduced under the conditions of the hydroxylamine production to the respective element in the aforementioned group, and added in an amount corresponding to about 3 to 5 atomic percent of the particular element in the aforementioned group, the percentage being with reference to the amount of platinum metal applied.

References Cited in the file of this patent

UNITED STATES PATENTS

| | | |
|---|---|---|
| 2,384,501 | Streicher | Sept. 11, 1945 |
| 2,475,155 | Rosenblatt | July 5, 1949 |
| 2,628,889 | Benson | Feb. 17, 1953 |